Jan. 26, 1932.   J. HALL   1,842,669
AEROPLANE
Filed Jan. 24, 1931   5 Sheets-Sheet 1
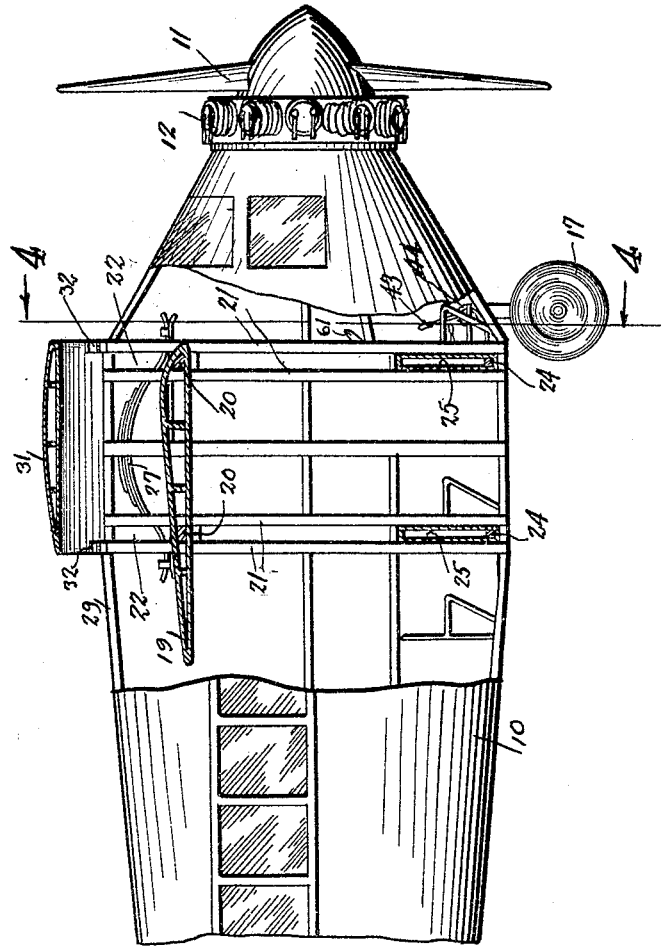
Fig. 1.
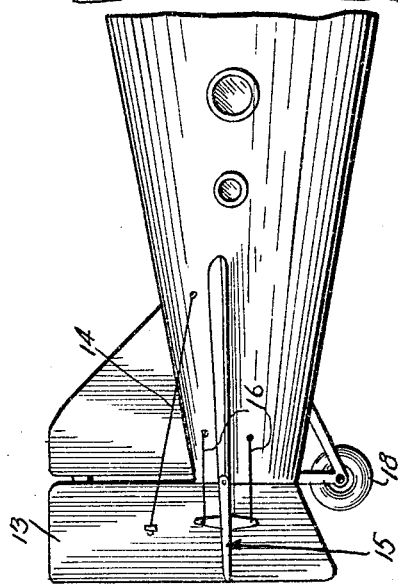
Inventor
John Hall.
By
Bryant & Lowry
Attorneys

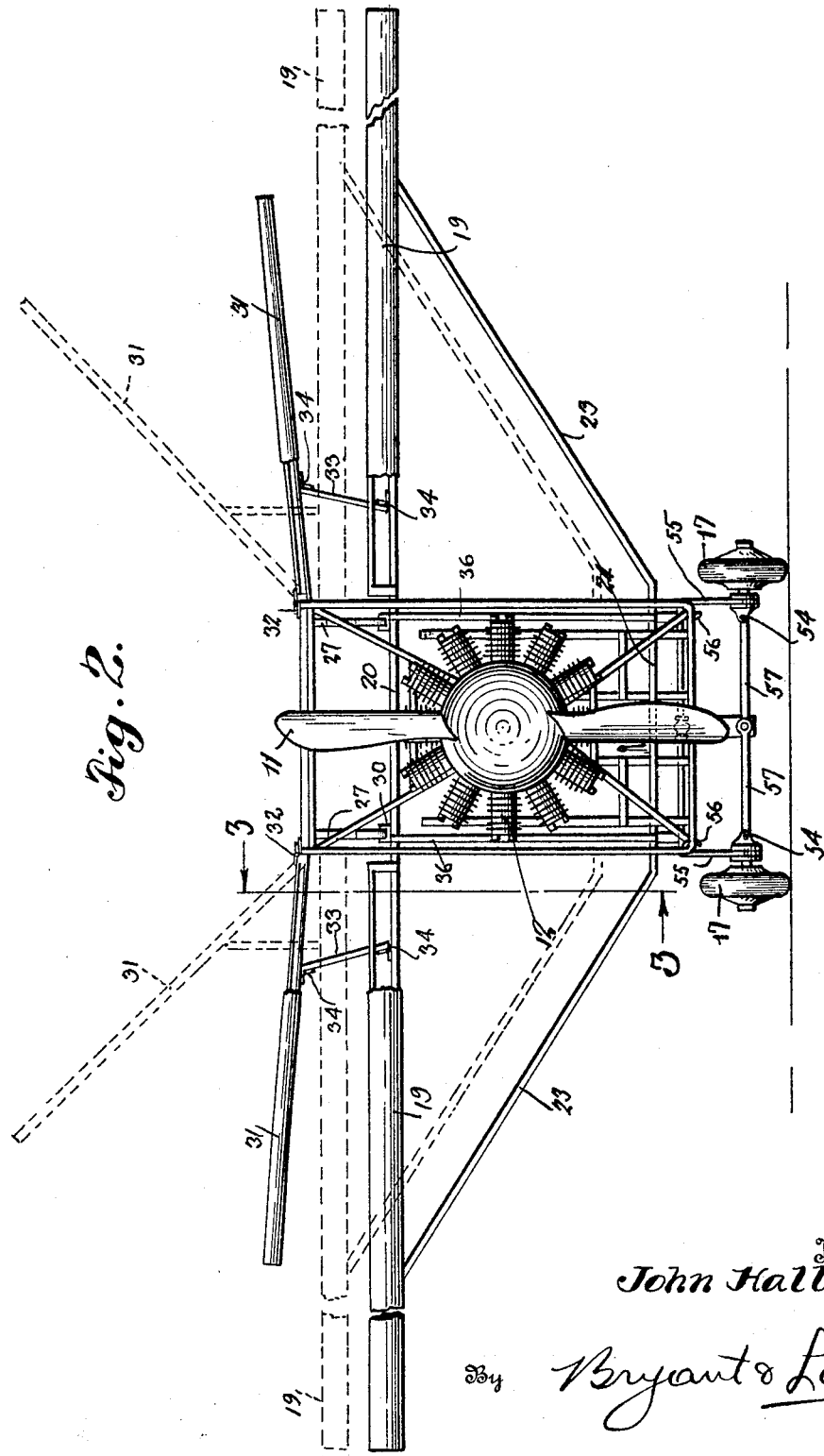

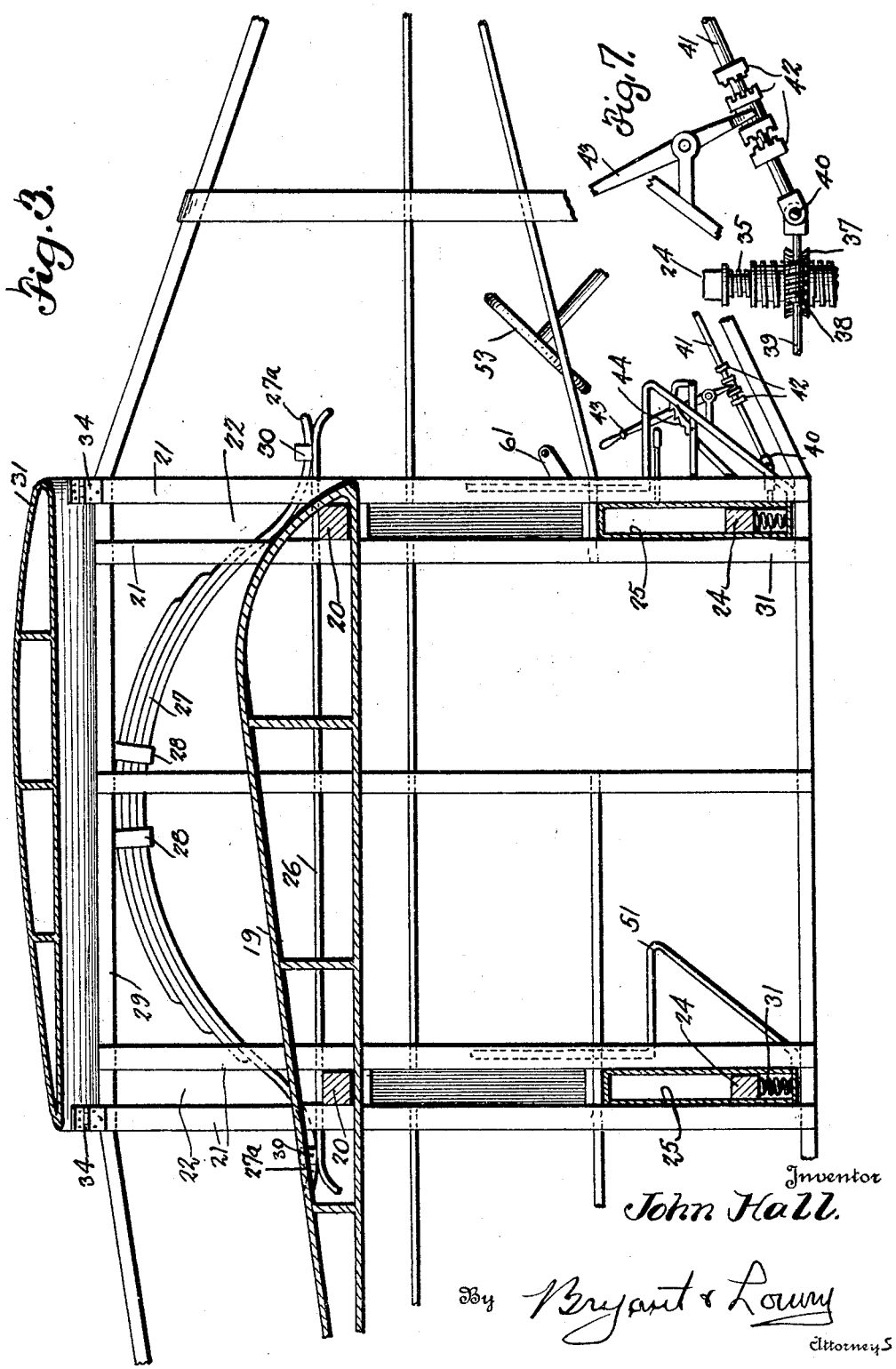

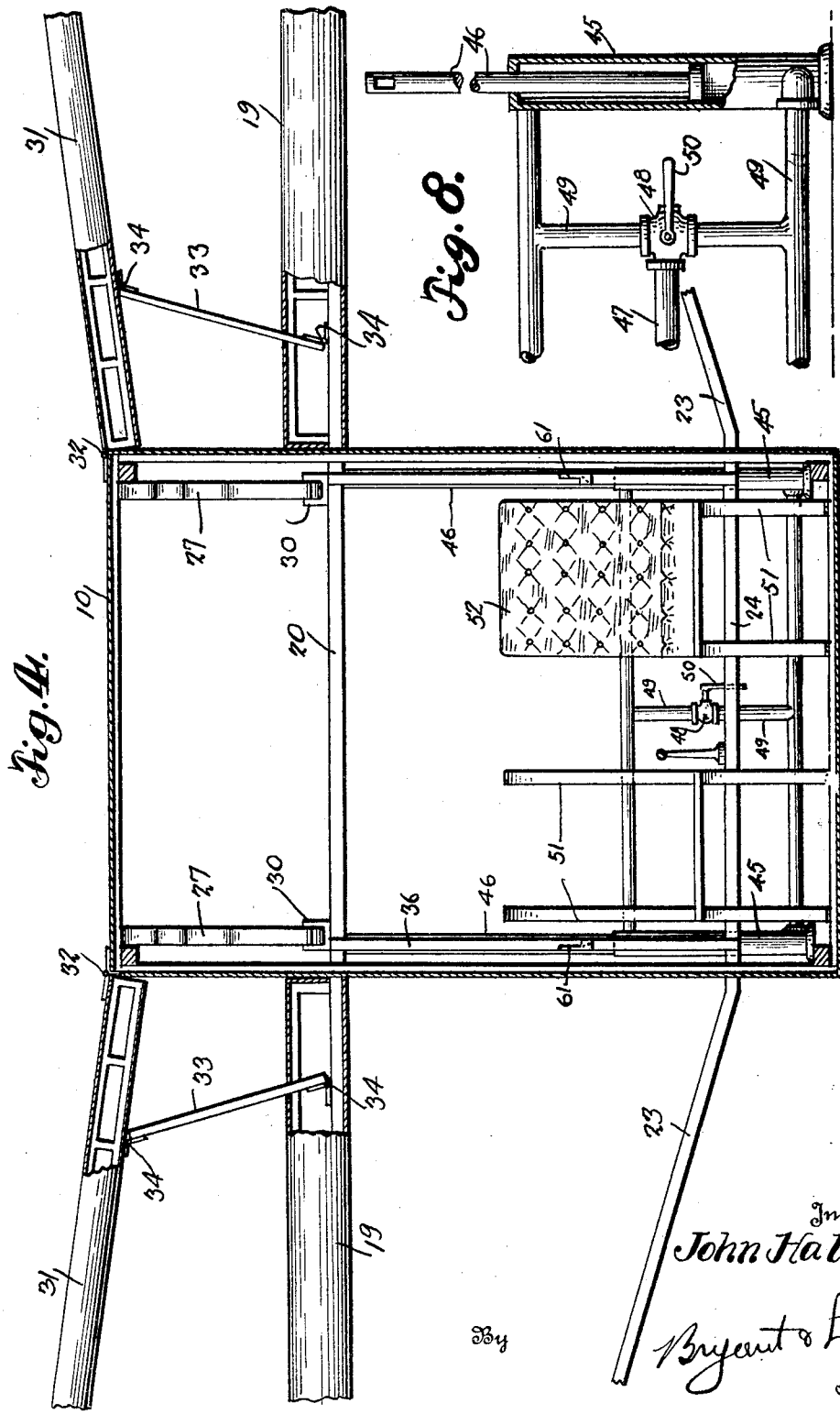

Jan. 26, 1932. J. HALL 1,842,669
AEROPLANE
Filed Jan. 24, 1931 5 Sheets-Sheet 5
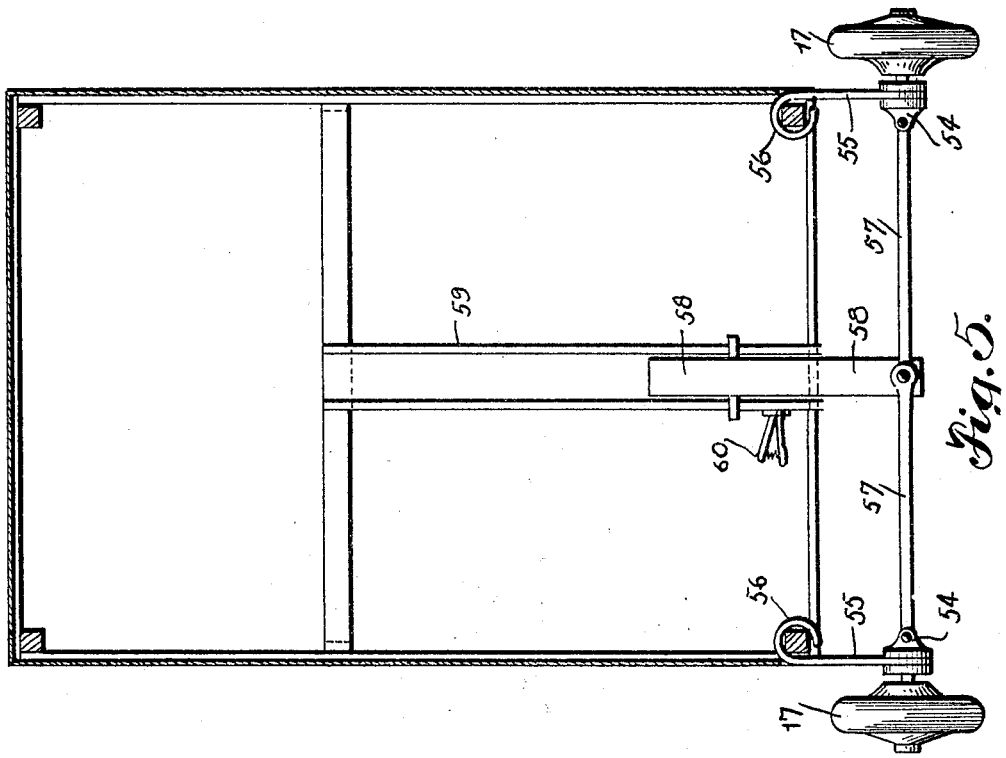
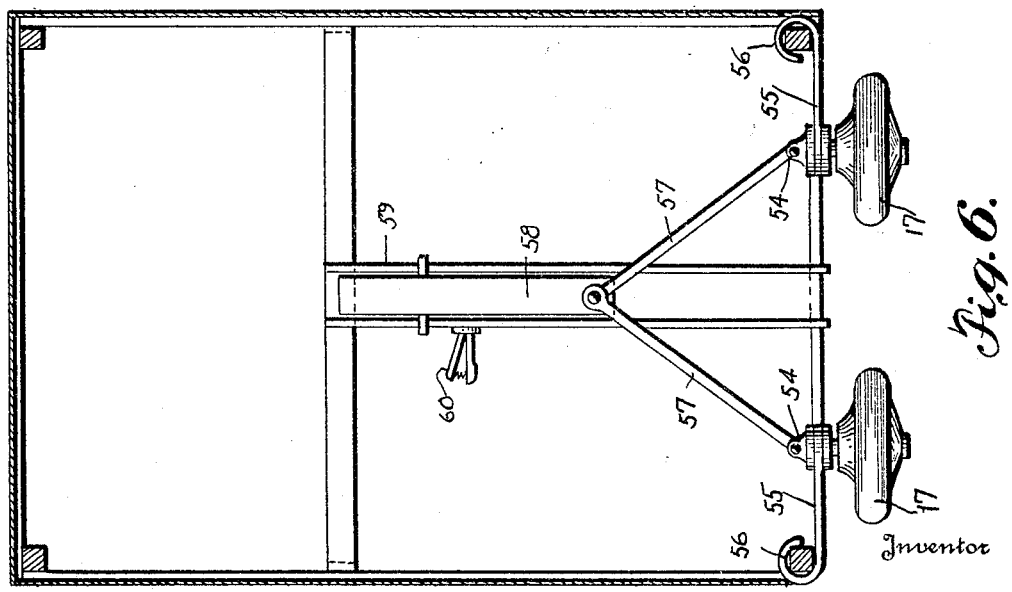
Inventor
John Hall.
By Bryant & Lowry
Attorneys Patented Jan. 26, 1932

1,842,669

UNITED STATES PATENT OFFICE

JOHN HALL, OF WEST SPRINGFIELD, MASSACHUSETTS

AEROPLANE

Application filed January 24, 1931. Serial No. 511,090.

This invention relates to certain new and useful improvements in aeroplanes and especially the wing structure thereof and is designed to accommodate the wing surface to varying density of the air or to air currents.

The primary object of the invention is to provide an aeroplane in which the sustaining wings are movably supported relative to the fuselage and being automatically adjusted or shifted by changings in the density of the air, or by the speed of air currents, the wing movements being utilized for maintaining uniform elevation during flight and also for increasing elevation of the aeroplane.

A further object of the invention is to provide an aeroplane of the foregoing character in which the sustaining wings for the aeroplane body are vertically shiftable on the body with compression springs carried by the aeroplane body and engaged with the wings to resist movement thereof in one direction during flight when air pockets or bumps are encountered and further acting for the absorption of air shocks when atmospheric disturbances are encountered.

Another object of the invention is to utilize the motion of the wings for obtaining elevation the wings moving upwardly relatively to the aeroplane body against spring tension thereon and maintaining such elevated position by air pressure during flight with the body of the aeroplane elevated by the springs carried thereby and engaged with the wings, means being provided in the form of mechanical and fluid operated devices for shifting the wings at will.

Another object of the invention is to provide a pair of auxiliary wings hinged to the aeroplane body or fuselage and operatively engaged with the main shifting wings and operating in bird-like fashion either manually or automatically as an aid during flight, the wing structure also operating for the absorption of shocks incident to landing.

A still further object of the invention is to provide an improved type of landing gear comprising wheels that may be shifted or folded to positions adjacent the bottom of the fuselage so that a minimum of resistance is offered during the flight of the plane.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an aeroplane constructed in accordance with the present invention, partly broken away and shown in section;

Figure 2 is a front elevational view, partly broken away showing the main vertically shiftable sustaining wings and the auxiliary superposed wings hinged to the aeroplane body and having link connections with the main wings;

Figure 3 is a longitudinal sectional view taken on line 3—3 of Figure 2 showing the spring devices associated with the main sustaining wings;

Figure 4 is a vertical cross-sectional view taken on line 4—4 of Figure 1 showing the link connections between the main and auxiliary wings and pneumatically operating mechanism for operating the wings.

Figure 5 is a detail cross-sectional view showing the landing gear comprising ground wheels in operative position;

Figure 6 is a sectional view, similar to Figure 5 showing the ground wheels of the landing gear shifted to positions adjacent the body of the aeroplane for offering less resistance during the flight;

Figure 7 is a detail view showing mechanical means under manual control for the operation of the wings; and Figure 8 is a detail view, partly in section showing pneumatically operating devices under manual control for shifting the wings.

Referring more in detail to the accompanying drawings, the aeroplane illustrated therein comprises a body or fuselage 10 equipped with a forwardly positioned propeller 11 operated by the motor 12, a rearwardly positioned rudder 13 having control cables 14 attached thereto and an elevator 15 operated by the cables 16. The landing gear comprises forwardly positioned ground wheels 17 and a rear skid wheel 18.

The aeroplane includes main sustaining wings 19, one disposed at each side of the fuselage 10 and aligned with each other, the main wing structure including a bar 20 extending longitudinally of the forward and trailing edge of the wing, the bar extending between vertical spaced guides 21 carried by the fuselage which provide slotted openings 22 in the side walls of the fuselage. Inclined brace bars 23 extend from the lower sides of the wings 19 adjacent their outer ends toward the lower opposite sides of the fuselage 10 with their lower ends integral with the cross bar 24 which work in channel members 25 extending transversely of the fuselage as shown in Figure 3 which act to prevent the entrance of water into the fuselage, should the aeroplane land on water. The bars 20 of the wing structure are connected by rails 26 arranged at opposite sides of the fuselage, the rails being engaged by spring devices carried by the fuselage and also engaged with the wing structure.

A leaf spring 27 is anchored intermediate its ends as at 28 to an upper frame bar 29 of the fuselage directly above each rail 26 with the lower free ends 27a of the spring engaged with the rails 26 and guided by the upstanding lugs 30, the springs 27 normally acting to move the main wings 19 downwardly relative to the fuselage with the opposite ends of the bars 24 engaged with shock absorbing springs 31 shown in Figure 3.

An auxiliary wing 31 is mounted above each main sustaining wing 19, being of less length than the main wing and is hinged at its inner end as at 32 to the upper edge of the fuselage 10 while a link 33 pivotally connected at opposite ends as at 34 to the wings 19 and 31 causes simultaneous movement of the wings, the location of the connecting link relative to the two wings causing the wing 31 to swing on its hinge connection 32 through a relatively wide arc while movement of the wing 19 is of a reciprocating character, this changed relation of the wings being illustrated by dotted lines in Figure 2.

While the main and auxiliary wings may be automatically shifted during flight, due to different air densities and atmospheric disturbances, it is also intended to provide means for positively shifting the wings, a mechanical device for accomplishing movement of the wings being shown in Figures 3 and 7. As shown in Figure 7, a jack screw 35 is disposed beneath the lower bars 24 of the main wing frame within the fuselage, it being understood that the lower and upper bars 20 and 24 of the main wing frame are connected by vertical corner bars 36 as shown in Figure 4, thus providing a rigid inner frame, the jack screw 35 carrying a worm wheel 37 engaged by a worm 38 on a worm shaft 39 that has a universal connection 40 with a power shaft 41, the latter being connected to or operated by an electric motor or the motor of the aeroplane. The power shaft 41 includes clutch elements 42 under control of the hand lever 43 for changing the direction of rotation of the jack screw 35 for raising and lowering the same and the main wing structure associated therewith. The lever 43 works over a rack segment 44 as shown in Figure 3 so that the clutch devices may be maintained in set position such as neutral permitting the wing to operate unrestrictedly.

A pneumatic operating device may also be employed for shifting the wings as illustrated in Figures 4 and 8, a cylinder 45 having a piston rod 46 therein extending from the upper end thereof and engaged with the rail 26 intermediate the ends of the latter, a cylinder and piston being associated with each rail. A fluid supply pipe 47 leading from a source of supply is in communication with the multiway valve 48 that has pipe connections 49 with the upper and lower ends of the cylinder 45, the valve 48 being provided with a control valve handle 50 for directing the flow of fluid into either end of the cylinder 45, the multi-way valve 48 of the bleeding type which permits the exhausting of air or fluid from either end of the cylinder 45 and pipe connections 49 therethrough.

The fuselage 10 is equipped with seat frames 51 as shown in several of the figures, one of which is illustrated as upholstered as at 52 in Figure 4 and of course, other appurtenances including the steering wheel 53 shown in Figure 3 for the control of the rudder 13.

The forward landing wheels 17 are mounted on hubs 54 that carry arms 55 having pivotal connection 56 with the fuselage, each hub having a link connection 57 with a plunger 58 movable in guideways 59 and retained in position by the clamp member 60. In Figure 5 the wheels 17 are illustrated as extended for landing purposes, while in Figure 6, the plunger 58 has been shifted into the guideways 59 for retracting the wheels 17 to occupy a position beneath the fuselage and adjacent thereto during flight.

In operation, the shiftable wings may be locked against movement by the devices 61 shown in Figure 4 but it will be found preferable during flight to release such lock devices so that when different air densities are encountered or other atmospheric disturbances which would cause deflection of travel of the aeroplane in the proper course, the wings would be free to shift relative to the fuselage. When the wings are shifted during flight by varying air densities or the like, the wings 19 constituting the main sustaining wings move upwardly of the fuselage while the auxiliary superposed wings 31 move upwardly upon their hinge mountings 32 as illustrated by dotted lines in Figure 2, the movement of the wings permitting direct travel of the aeroplane without deflecting the latter from its natural course in flight. The wing movement is serviceable in obtaining altitude by the springs 27 being compressed upon upward movement thereof and as the wings, when so elevated, ride upon the air they are prevented from being lowered by the springs 27, the latter then operating with the wing frame as an abutment therefor to raise the fuselage. In normal flight, the main and auxiliary wings assume slightly elevated positions with relation to the fuselage causing compression of the springs 27 to a limited degree, resulting in the cushioning of the fuselage, the springs absorbing shocks incident to travel while variations in wing positions relative to the fuselage always result in elevation of the fuselage. The wing movement is also effected in obtaining rapid altitude and in leaving the ground, and at such times, the wings may be operated by the devices shown in Figures 7 and 8 which cause elevation of the main and auxiliary wings, the subsequent lowering movement of the wings raising the fuselage, the auxiliary wings 31 operating in bird-like fashion operating as a stabilizer and keeping the aeroplane on even keel.

This operation is also effective when landing, the wings being maintained in an elevated condition until just prior to landing when they are lowered and the fuselage elevated which offers a minimum of shock during landing to the fuselage.

While there are herein shown and described the preferred embodiments of the invention, it is nevertheless to be understood that minor changes may be made therein without departing from the spirit and scope of the invention as claimed.

I claim:—

1. In an aeroplane of the character described, a fuselage, wings vertically shiftable thereon, and auxiliary wings hingedly mounted on the fuselage and having link connections with the aforesaid wings.

2. In an aeroplane of the character described, a fuselage, wings vertically shiftable thereon, auxiliary wings hingedly mounted on the fuselage and having link connections with the aforesaid wings, and means for vertically shifting the wings.

3. In an aeroplane of the character described, a fuselage, a wing structure vertically reciprocable on the fuselage, cushioning devices interposed between the fuselage and wing structure to resist movement of the wing structure in one direction, and a stabilizing auxiliary wing hingedly mounted above the wing structure at each side of the fuselage and having link connections with the wing structure.

4. In an aeroplane of the character described, a fuselage, a wing structure vertically reciprocable on the fuselage, spring devices carried by the fuselage and engaged with the upper side of the wing structure to be compressed by the latter upon upward movement, and a stabilizing auxiliary wing hingedly mounted above the wing structure at each side of the fuselage and having link connections with the wing structure.

5. In an aeroplane of the character described, a fuselage, a wing structure vertically reciprocable on the fuselage, cushioning devices interposed between the fuselage and wing structure to resist movement of the wing structure in one direction, the fuselage subsequently following the wing structure in the direction of movement of the latter to obtain elevation, and a stabilizing auxiliary wing hingedly mounted above the wing structure at each side of the fuselage and having link connections with the wing structure.

6. In an aeroplane of the character described, a fuselage, a wing structure vertically reciprocable on the fuselage, spring devices carried by the fuselage and engaged with the upper side of the wing structure to be compressed by the latter upon upward movement, the fuselage subsequently following the wing structure in the direction of movement of the latter to obtain elevation, and a stabilizing auxiliary wing hingedly mounted above the wing structure at each side of the fuselage and having link connections with the wing structure.

7. In an aeroplane of the character described, a fuselage, a wing structure vertically reciprocable on the fuselage, spring devices carried by the fuselage and engaged with the upper side of the wing structure to be compressed by the latter upon upward movement, and manually controlled mechanical means for causing vertical movements of the wing structure relative to the fuselage.

8. In an aeroplane of the character described, a fuselage, a wing structure vertically reciprocable on the fuselage, spring devices carried by the fuselage and engaged with the upper side of the wing structure to be compressed by the latter upon upward movement, and fluid operated means for causing vertical movements of the wing structure relative to the fuselage.

In testimony whereof I affix my signature.

JOHN HALL.